(12) United States Patent
Herrschaft et al.

(10) Patent No.: US 11,345,544 B2
(45) Date of Patent: May 31, 2022

(54) APPARATUSES, SYSTEMS, AND METHODS FOR THE AUTOMATED RETRIEVAL AND DISPENSING OF ARTICLES

(71) Applicant: McKesson Corporation, Irving, TX (US)

(72) Inventors: Rich Herrschaft, West Chester, PA (US); Jerome Albert, Frazer, PA (US); Merle Hertzler, West Chester, PA (US); Sofia Tanvir, North Wales, PA (US)

(73) Assignee: MCKESSON CORPORATION, San Francisco, CA (US)

( * ) Notice: Subject to any disclaimer, the term of this patent is extended or adjusted under 35 U.S.C. 154(b) by 160 days.

(21) Appl. No.: 16/368,956

(22) Filed: Mar. 29, 2019

(65) Prior Publication Data

US 2020/0307913 A1 Oct. 1, 2020

(51) Int. Cl.

| | |
|---|---|
| *B65G 1/06* | (2006.01) |
| *B65G 47/90* | (2006.01) |
| *B25J 9/02* | (2006.01) |
| *B25J 15/06* | (2006.01) |
| *G07F 11/16* | (2006.01) |
| *G07F 11/28* | (2006.01) |
| *G07F 11/38* | (2006.01) |
| *B65G 47/91* | (2006.01) |
| *B65G 1/137* | (2006.01) |

(52) U.S. Cl.
CPC .............. *B65G 1/06* (2013.01); *B25J 9/026* (2013.01); *B25J 15/0616* (2013.01); *B65G 47/90* (2013.01); *B65G 47/91* (2013.01); *G07F 11/165* (2013.01); *G07F 11/1657* (2020.05); *G07F 11/28* (2013.01); *G07F 11/38* (2013.01); *B65G 1/1376* (2013.01)

(58) Field of Classification Search
CPC .................................. B65G 1/06; G07F 11/28
See application file for complete search history.

(56) References Cited

U.S. PATENT DOCUMENTS

| | | | |
|---|---|---|---|
| 6,176,392 B1 * | 1/2001 | William | G07F 17/0092 |
| | | | 221/109 |
| 6,343,711 B1 | 2/2002 | Coughlin | |
| 6,370,215 B1 | 4/2002 | Pinto et al. | |
| 6,497,339 B1 | 12/2002 | Geltser et al. | |
| 6,564,121 B1 | 5/2003 | Wallace et al. | |
| 6,631,826 B2 | 10/2003 | Pollard et al. | |
| 6,684,914 B2 | 2/2004 | Gershman et al. | |

(Continued)

*Primary Examiner* — Thomas Randazzo
(74) *Attorney, Agent, or Firm* — Ballard Spahr LLP

(57) ABSTRACT

A method and apparatus for dispensing and retrieving products is provided. An apparatus may include: a plurality of shelf units. Each shelf unit extends longitudinally between a first end and a second end. The first end may be configured to receive articles, and the second end may be configured to present articles for retrieval in a retrieval position. Each of the plurality of shelf units is arranged with a respective second end facing a retrieval area. Each of the plurality of shelf units is inclined with the first end being lower than the second end. The apparatus may also include a retrieval device comprising an end-of-arm tool. The retrieval device is disposed within the retrieval area and configured to attach the end-of-arm tool to an article in a retrieval position of each of the plurality of shelf units.

20 Claims, 5 Drawing Sheets

(56) References Cited

U.S. PATENT DOCUMENTS

| | | |
|---|---|---|
| 6,735,497 B2 | 5/2004 | Wallace et al. |
| 6,892,512 B2 | 5/2005 | Rice et al. |
| 6,898,919 B2 | 5/2005 | Kim |
| 6,957,126 B2 | 10/2005 | Kim |
| 6,970,769 B2 | 11/2005 | Rice et al. |
| 6,971,541 B2 | 12/2005 | Williams et al. |
| 6,983,579 B2 | 1/2006 | Rice et al. |
| 7,080,755 B2 | 7/2006 | Handfield et al. |
| 7,175,381 B2 | 2/2007 | Guerra |
| 7,185,477 B2 | 3/2007 | Rice et al. |
| 7,258,521 B2 | 8/2007 | Guerra et al. |
| 7,308,338 B2 | 12/2007 | Guerra |
| 7,344,049 B2 | 3/2008 | Daniels et al. |
| 7,383,862 B2 | 6/2008 | Geltser et al. |
| 7,412,814 B2 | 8/2008 | Rice et al. |
| 7,430,838 B2 | 10/2008 | Rice et al. |
| 7,454,261 B2 | 11/2008 | Kim |
| 7,584,018 B2 | 9/2009 | Karwacki, Jr. et al. |
| 7,668,618 B2 | 2/2010 | Szesko et al. |
| 7,703,637 B2 | 4/2010 | Michelli |
| 7,721,914 B2 | 5/2010 | Handfield et al. |
| 7,805,216 B2 | 9/2010 | Shows et al. |
| 7,832,591 B2 | 11/2010 | Karwacki, Jr. et al. |
| 7,837,061 B2 | 11/2010 | Dummer et al. |
| 7,866,506 B2 | 1/2011 | Daniels et al. |
| 7,870,973 B2 | 1/2011 | Michelli et al. |
| 7,909,207 B2 | 3/2011 | Handfield et al. |
| 7,912,582 B1 | 3/2011 | Holtje et al. |
| 7,949,426 B2 | 5/2011 | Handfield et al. |
| 7,949,427 B2 | 5/2011 | Michelli et al. |
| 7,970,490 B2 | 6/2011 | Fellows et al. |
| 7,988,017 B2 | 8/2011 | Kulberg et al. |
| 7,988,404 B2 | 8/2011 | Williams et al. |
| 8,016,095 B2 | 9/2011 | Daniels et al. |
| 8,020,724 B2 | 9/2011 | Remis et al. |
| 8,054,086 B2 | 11/2011 | Rivenbark, Jr. |
| 8,061,560 B2 | 11/2011 | Farnsworth et al. |
| 8,121,725 B2 | 2/2012 | Baker et al. |
| 8,136,332 B2 | 3/2012 | Rice et al. |
| 8,180,484 B2 | 5/2012 | Baker et al. |
| 8,240,506 B2 | 8/2012 | Kulberg et al. |
| 8,244,401 B2 | 8/2012 | Michelli et al. |
| 8,261,936 B2 | 9/2012 | DuMond et al. |
| 8,271,128 B1 | 9/2012 | Schultz |
| 8,275,481 B2 | 9/2012 | Rice et al. |
| 8,281,955 B2 | 10/2012 | Farnsworth et al. |
| 8,340,809 B2 | 12/2012 | Chadbourne |
| 8,428,775 B2 | 4/2013 | Baker et al. |
| 8,434,641 B2 | 5/2013 | Coughlin et al. |
| 8,464,901 B2 | 6/2013 | Karwacki, Jr. et al. |
| 8,467,899 B2 | 6/2013 | Karwacki, Jr. et al. |
| 8,499,967 B2 | 8/2013 | Michelli |
| 8,616,409 B2 | 12/2013 | Young et al. |
| 8,651,320 B2 | 2/2014 | DuMond et al. |
| 8,651,326 B2 | 2/2014 | Pollard et al. |
| 8,714,405 B2 | 5/2014 | Farnsworth et al. |
| 8,774,964 B2 | 7/2014 | Shows et al. |
| 8,777,055 B2 | 7/2014 | Farnsworth et al. |
| 8,798,788 B2 | 8/2014 | Williams et al. |
| 8,813,997 B2 | 8/2014 | Karwacki, Jr. et al. |
| 8,833,604 B2 | 9/2014 | Karwacki, Jr. et al. |
| 8,855,811 B1 | 10/2014 | Schultz |
| 8,896,322 B2 | 11/2014 | Rivenbark, Jr. |
| 8,972,047 B2 | 3/2015 | Johnson et al. |
| 8,972,050 B2 | 3/2015 | Johnson et al. |
| 9,147,044 B2 | 9/2015 | Shows et al. |
| 9,241,875 B2 | 1/2016 | Davis et al. |
| 9,254,961 B2 | 2/2016 | Kim |
| 9,296,545 B2 | 3/2016 | Daniels et al. |
| 9,299,210 B2 | 3/2016 | Parrish et al. |
| 9,499,328 B2 | 11/2016 | Daniels et al. |
| 9,688,471 B2 | 6/2017 | Hellenbrand |
| 9,701,474 B2 | 7/2017 | Hellenbrand |
| 9,745,131 B2 | 8/2017 | Hawkes et al. |
| 9,932,176 B2 | 4/2018 | Hawkes et al. |
| 10,007,764 B2 | 6/2018 | Kim |
| 10,035,258 B2 | 7/2018 | Davis et al. |
| 10,087,001 B2 | 10/2018 | Hellenbrand |
| 2004/0065630 A1* | 4/2004 | Ondrasik ................ A47F 1/126 211/59.3 |
| 2004/0090158 A1* | 5/2004 | Horowitz ............ A47B 88/467 312/319.4 |
| 2006/0277269 A1* | 12/2006 | Dent ...................... B65G 43/08 709/217 |
| 2008/0093371 A1* | 4/2008 | Ubidia .................... G07F 11/42 901/14 |
| 2013/0131862 A1* | 5/2013 | Jefferies ................ G16H 20/13 221/133 |
| 2013/0149080 A1* | 6/2013 | Martin De Pablo . B65G 1/0421 414/281 |
| 2014/0052498 A1* | 2/2014 | Marshall ............. G07F 11/1653 700/218 |
| 2017/0036845 A1 | 2/2017 | Daniels et al. |
| 2017/0174431 A1* | 6/2017 | Borders .................. B25J 5/007 |
| 2017/0351839 A1* | 12/2017 | Hellenbrand ............ B65G 1/08 |
| 2018/0085287 A1 | 3/2018 | Kim |
| 2019/0042701 A1 | 2/2019 | Wingenter et al. |

* cited by examiner

APPARATUSES, SYSTEMS, AND METHODS FOR THE AUTOMATED RETRIEVAL AND DISPENSING OF ARTICLES

TECHNOLOGICAL FIELD

Embodiments of the present invention relate generally to automated retrieval and dispensing of articles, and in particular, to a system configured to orient articles and maintain orientation of articles while feeding articles to a retrieval and dispensing apparatus.

BACKGROUND

The dispensing of goods is a common practice that can often be time consuming and prone to error, particularly when performed manually. The automation of dispensing can improve both efficiency and accuracy of the dispensing operation; however, different types of articles necessarily require different types of dispensing. Further, automated dispensing can be costly, and if the dispensing operations are not frequent enough, or there is a low-risk associated with errors, the cost of automation may not be justified.

Automated dispensing may conventionally occupy a substantial footprint, particularly when there are many types of products to be dispensed. Products may be arranged in a manner that is less efficient for storage, but more conducive to an automated dispensing operation, which may substantially increase the floor space required for automated dispensing, thereby increasing the effective cost while decreasing the efficiency. Therefore it may be desirable to implement apparatuses, systems, and methods which may provide automated retrieval and dispensing in a relatively compact form factor to provide efficiency improvements and flexibility in installation.

SUMMARY

Embodiments of the present invention may provide an apparatus including: a plurality of shelf units, each shelf unit extending longitudinally between a first end and a second end, where the first end may be configured to receive articles, and the second end may be configured to present articles for retrieval in a retrieval position, where each of the plurality of shelf units is arranged with a respective second end facing a retrieval area, where each of the plurality of shelf units is inclined with the first end being lower than the second end; and a retrieval device comprising an end-of-arm tool, where the retrieval device is disposed within the retrieval area and configured to attach the end-of-arm tool to an article in a retrieval position of each of the plurality of shelf units. The plurality of shelf units may be arranged in a bank of rows of adjacent shelf units, and columns of vertically stacked shelf units, where rows are arranged with longitudinally extending sides facing one another, and vertical stacks are arranged with a top of a shelf unit proximate the bottom of a shelf unit situated above. The bank of rows and columns of shelf units may be configured with each row above a bottom row in the vertical stack offset away from the receiving area relative to a row immediately below. The bank of shelf units may be a first bank of shelf units, and the apparatus may optionally include a second bank of rows of adjacent shelf units and columns of vertically stacked shelf units, where the second end of the shelf units of the second bank may be arranged to face the second end of the shelf units of the first bank, defining a retrieval area between the first bank and the second bank.

The retrieval device of some embodiments may include a gantry from which an end-of-arm-tool extends into the retrieval area, where the gantry advances the end-of-arm-tool along the second end of the plurality of shelf units. The end-of-arm-tool may include one or more suction cups configured to attach and secure a product to the end-of-arm-tool. The end-of-arm-tool may include a gripping apparatus having two or more fingers configured to grasp a product from a retrieval end of a shelf unit. Each of the shelf units may be inclined between about five degrees and about fifteen degrees from horizontal. Embodiments may include a labeling station where the labeling station includes a printer to print indicia to a label corresponding to a product retrieved from one of the plurality of shelf units. The label station may be configured to apply a printed label corresponding to a product in response to the product being received at the label station.

According to some embodiments, at least one of the plurality of shelf units may include a pusher to bias products received on the shelf unit toward the second end of the shelf unit. The pusher may include a screw-driven biasing plate. The pusher may include a conveyor belt. Embodiments may include a controller, where the controller may be configured to receive an order for a product, identify a shelf unit corresponding to the product of the order, advance the retrieval device to the shelf unit corresponding to the product of the order, retrieve the product of the order, and dispense the product of the order to a dispensing station. An association may be made between a product and a shelf unit in response to an indication of the product and an identifier of the corresponding shelf unit being provided to the controller during a loading operation of the shelf unit.

Embodiments of the present disclosure may provide an apparatus for dispensing products. The apparatus may include a plurality of shelf units in two opposing banks of shelf units, each bank having rows of shelf units and columns of shelf units, where each shelf unit longitudinally extends between a first end configured to receive articles, and a second end configured to present articles; and a retrieval area defined between the two banks of shelf units, where the second end of each shelf unit faces the retrieval area, where each row of shelf units above a lowest row of shelf units in each bank is offset by a predetermined distance away from the retrieval area relative to a row of shelf units below, and where each shelf unit may be inclined on an upward angle toward the retrieval area. Embodiments may include a retrieval device operable in the retrieval area, where a product at a second end of any of the shelf units is accessible to the retrieval device. The retrieval device may include a gantry, where a retrieval tool may be configured to descend vertically from the gantry to reach a product at the second end of any of the shelf units. Embodiments may include a dispensing area, where the retrieval device may be configured to dispense a retrieved product to the dispensing area from a shelf unit.

DESCRIPTION OF THE DRAWINGS

Reference now will be made to the accompanying drawings, which are not necessarily drawn to scale, and wherein.

DETAILED DESCRIPTION

Figure 1:
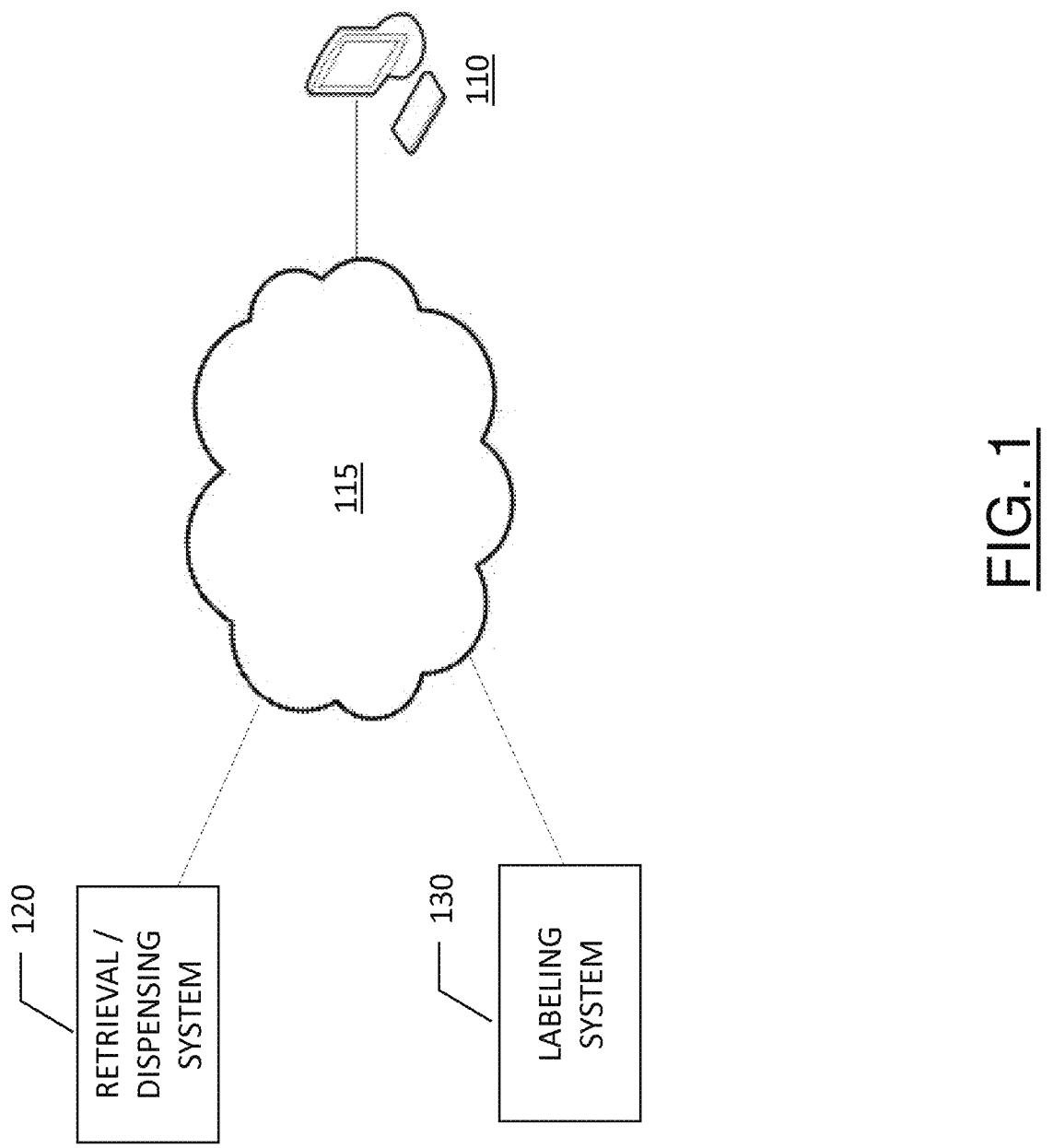
FIG. 1 illustrates a schematic of a retrieval and dispensing system in communication with a labeling system via a network according to an example embodiment of the present disclosure.

Embodiments of the present invention may provide various apparatuses, systems, and methods for improving the efficiency with which articles are retrieved and dispensed. Some embodiments and components of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

Example embodiments of the present disclosure may provide a method, apparatus, and computer program product which may facilitate the automated retrieval and dispensing of articles, which may be used in a wide variety of applications ranging from industrial manufacturing to precision part procurement to retail distribution. Embodiments may be used in dispensary settings where articles are stored and staged for automated retrieval followed by automated dispensing. Embodiments described herein overcome various challenges of automated retrieval and dispensing, and do so in a compact form factor that may be accessed and maintained efficiently.

Automated retrieval and dispensing as described herein may improve efficiency and accuracy of dispensing of articles incorporating mechanisms that may solve issues identified by the applicant as substantial hurdles in automating the retrieval and dispensing of articles, particularly when the articles are of non-uniform shapes and sizes, and when dispensing occurs in a just-in-time manner responsive to orders on demand.

As noted above, systems for automated retrieval and dispensing may be useful in a wide variety of implementations ranging from industrial applications to retail applications. For example, embodiments may be implemented in an industrial setting to retrieve and dispense parts for assemblies, or tools in a machine shop. In a retail application, embodiments may be used for retrieving and dispensing articles to fulfill customer orders. Further, embodiments may be implemented in high-volume fulfillment centers where customer orders are filled at a high rate from a wide variety of available products. These implementations may include, for example, pharmaceutical fulfillment centers or pharmacies that dispense medications or medical supplies Automated retrieval and dispensing systems of example embodiments described herein may be used to dispense various types of articles of a wide variety of sizes. While automated dispensing systems of example embodiments described herein may be used to dispense various types of articles, the primary embodiment described herein is particularly well suited for dispensing medications and medical supplies. Further, example embodiments of automated retrieval and dispensing systems described herein may be replenished while the system is operating, thereby reducing downtime and improving the efficiency of the retrieval and dispensing.

As noted above, an automated dispensing system according to example embodiments may be implemented in, for example, a retail establishment or a fulfillment center. Articles dispensed from a retail establishment or fulfillment center may be of a variety of form factors from small, lipstick-sized boxes or tubes, to larger boxes that may contain medication in large quantities and/or medication delivery products or supplies. Further, articles may require different degrees of care in handling. For example, an ampoule or a vial may be relatively fragile while a container of pills or tablets may be relatively durable. Still further, packaging configurations may differ among articles, from uniform boxes to blister packaging to non-uniform boxes or bags.

FIG. 1 depicts a system that can be used in conjunction with various embodiments of the present disclosure. As shown in FIG. 1, an example embodiment of the system may include an automated retrieval/dispensing system 120, one or more networks 115, and an automated labeling station 130. Embodiments may include various other devices which may be in communication with the one or more networks 115, such as an approval station 100 which may be used for manual review and/or audit of an automated process performed by one or both of the automated retrieval/dispensing system 120 and the automated labeling station 130. Embodiments may further include other network entities from which data may be received from or transmitted to, as will be described further below. Each of the components of the system may be in electronic communication with, for example, one another over the same or different wireless or wired networks (e.g., network 115) including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

Figure 2:
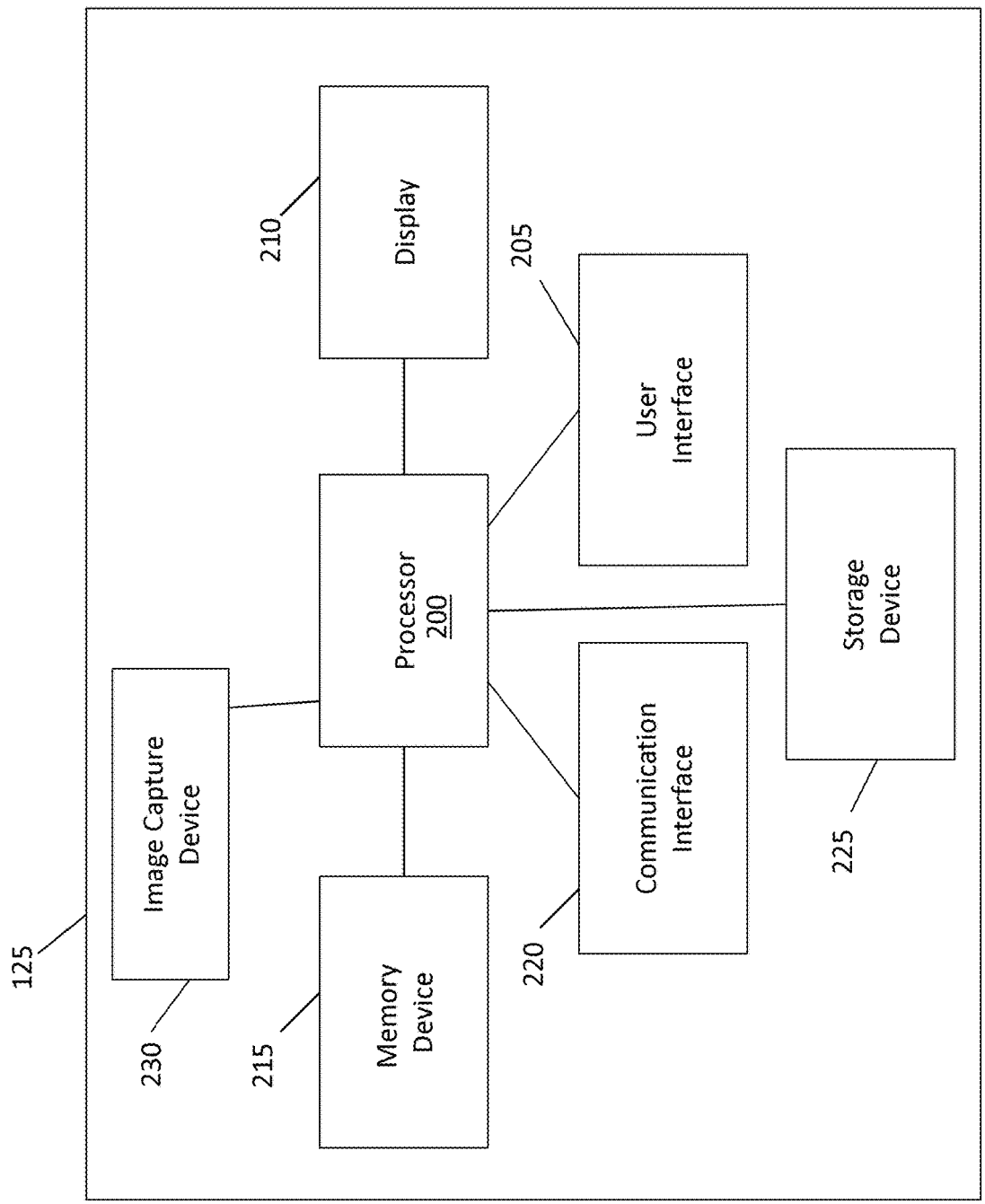
FIG. 2 illustrates a schematic of a controller for controlling a retrieval and dispensing system according to an example embodiment of the present disclosure.

Example embodiments of the automated retrieval and dispensing system 120 and/or the labeling system 130 as described herein may include a controller configured to control or otherwise facilitate the activities performed at the automated retrieval and dispensing system. FIG. 2 provides a schematic of an example embodiment of a controller 125 of an automated labeling system and/or automated retrieval and dispensing system. In general, the term "controller" may refer to, for example, any computer, computing device, desktop, tablet, notebook, laptop, distributed system, server, processing device, or combination of processing devices adapted to perform the functions described herein.

In an example embodiment in which the automated retrieval/dispensing system 120 and labeling system 130 is used for dispensing and labeling of medications, the controller 125 may include, be associated with, or be in communication with a variety of computing entities, such as pharmacy inventory management systems, a medication identification database, data storage/facilitation computing entities, or other devices that may interface with inventory management, dispensing, replenishing, etc. While example embodiments of automated dispensing systems may be implemented in virtually any setting which may benefit from automated dispensing of articles, embodiments described herein will be described generally with respect to the field of healthcare in which medications may be dispensed for patients or caregivers, such as medications packaged in "unit of use" packages. However, it is appreciated that embodiments of the present invention may apply to various other embodiments of automated dispensing systems and devices.

As will be understood from FIG. 2, in one embodiment, the controller 125 may include a processor 200 that communicates with other elements of the controller 125 via a system interface or bus. The processor 200 may be embodied in a number of different ways. For example, the processor 200 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an example embodiment, the processor 200 may be configured to execute instructions stored in memory or otherwise accessible to the processor 200. As such, whether configured by hardware or software methods, or by a combination thereof, the processor 200 may represent an entity capable of performing operations according to embodiments of the present invention when configured accordingly. For example, as discussed in more detail below, the controller 125 may be configured to, among other things, facilitate accurate identification of unit of use packages of medication. The controller 125 may also be used by the labeling system 130 to write an identification of the identified medication on a label along with an intended recipient and any other relevant information to be applied to the retrieved article. A user interface 205 may be configured for user input to initiate the automated retrieval/dispensing process or to confirm, advance, or otherwise interact with operations of the automated retrieval and dispensing process. The user interface 205 may include a keyboard, a pointing device, or other mechanism for a user to communicate with the processor 200 and interact with the controller 125.

A controller according to example embodiments may further include a display 210 which may be configured to present information to a user pertaining to the automated retrieval/dispensing process and to communicate alerts or confirm success of various steps of the automated retrieval/dispensing/labeling process. The display 210 may also be configured to present information to a user pertaining to the status of the automated retrieval/dispensing system, information regarding inventory, or any information which may be useful to a user of the device. The display 210 may include a touch screen display which may partially or fully comprise the user interface 205. As noted above, example embodiments may include a system that also incorporates the approval station. In such an embodiment, the user interface 205 and display 210 may be used for the approval of operations of the retrieval and dispensing process, auditing the automated retrieval/dispensing/labeling process, or reviewing alerts from the system.

The controller 125 may further include or be in communication with an image capture device 230. The image capture device may include a still camera, a video camera, a one or two-dimensional barcode reader, and/or the like. The image capture device 230 of embodiments of the present invention may be used to capture images and/or video of a unit of use package once it is retrieved and/or dispensed from a system as described herein. The user interface 205, as with any of the components of the controller 125, may be located remotely from the controller 125 and may be accessed via a wired or wireless network.

The controller 125 may further include transitory and non-transitory memory device 215, which may include both random access memory (RAM) and read only memory (ROM). The ROM may be used to store a basic input/output system (BIOS) containing the basic routines that help to transfer information to the different elements within the controller 125.

In addition, in one embodiment, the controller 125 may include or be in communication with at least one storage device 225, such as a hard disk drive, a CD drive, and/or an optical disk drive for storing information on various computer-readable media. The storage device(s) 225 and its associated computer-readable media may provide non-volatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. The storage device may be configured to store, for example, a list of orders to be retrieved, dispensed, and labeled and/or an audit trail of unit of use packages retrieved, dispensed, and labeled from received orders.

Furthermore, a number of executable instructions, applications, scripts, program modules, and/or the like may be stored by the various storage devices 225 and/or within memory device 215. As discussed in more detail below, these executable instructions, applications, program modules, and/or the like may control certain aspects of the operation of the controller 125 with the assistance of the processor 200 and operating system, although their functionality need not be modularized. In addition to the program modules, the controller 125 may store or be in communication with one or more databases.

Also located within the automated packaging station controller 125, in one embodiment, is a communication interface 220 for interfacing with various computing entities. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the automated storage device controller 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

Figure 3:
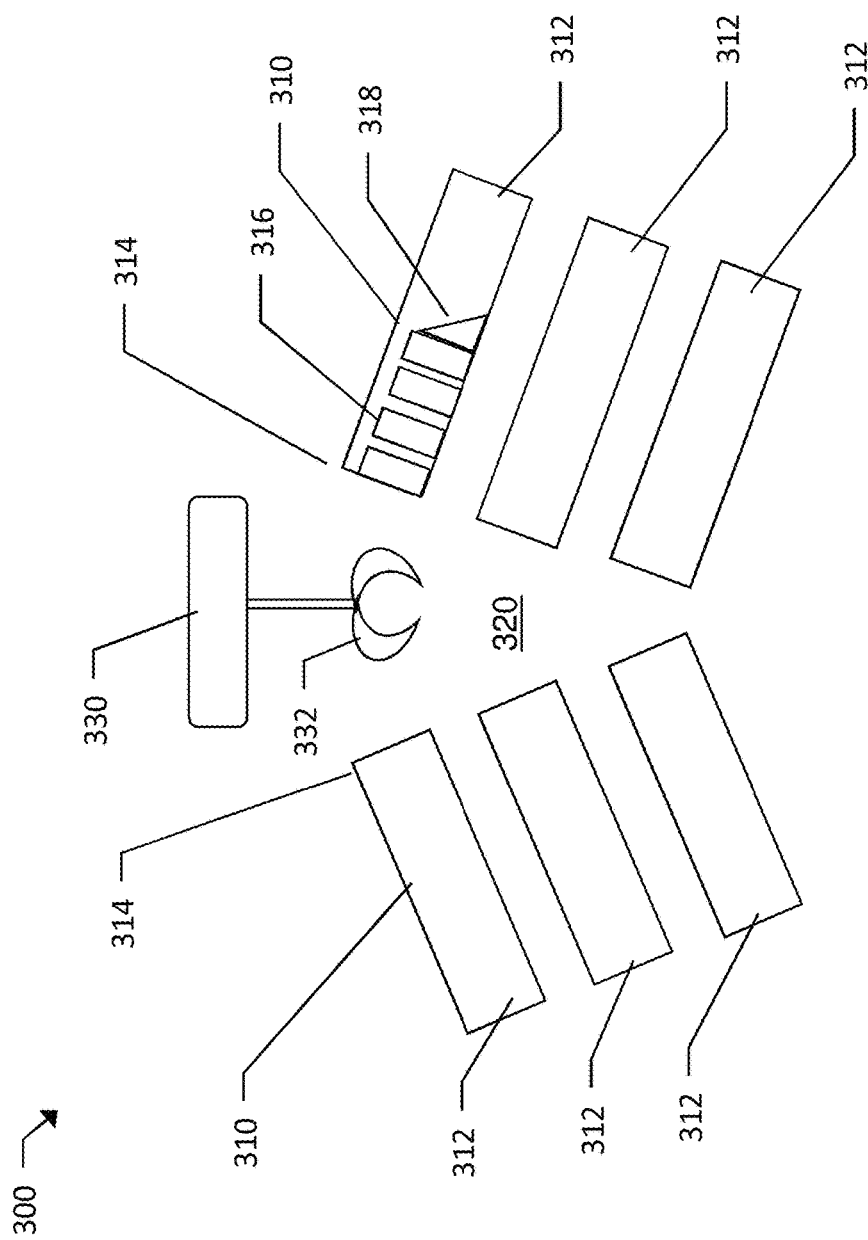
FIG. 3 illustrates a retrieval and dispensing system according to an example embodiment of the present disclosure.

In an example embodiment described herein, an automated retrieval and dispensing system may be used to retrieve, dispense, and label unit of use packaged products in a variety of environments, such as in a high-volume dispensary for distribution throughout a region. FIG. 3 illustrates an example embodiment of a retrieval and dispensing system 300 which may be configured to automatically retrieve and dispense unit of use packages of medication in response to receiving a prescription order. Automated dispensing systems 300 which may benefit from example embodiments of the present disclosure may include a plurality of upwardly-angled modular storage shelves 310 arranged in a stacked manner with a loading end 312 of each shelf 310 and a retrieval end 314 of each shelf 310.

As shown in the embodiment of FIG. 3, the modular shelf units 310 of the system 300 are angled upwardly toward a central retrieval area 320. While FIG. 3 illustrates a single set of modular shelf units 310, arranged in a stacked manner on either side of the retrieval area 320, embodiments may include a plurality of sets of modular shelf units extending along a shared retrieval area 320. The central retrieval area 320 is an area that is accessible to and traversed by a retrieval apparatus 330, which may be embodied by a number of different devices, such as a multi-axis robot arm or a gantry retrieval device, for example. However, example embodiments described herein will focus primarily on the gantry retrieval device, described further below, operating above the retrieval area 320 and able to traverse along a plurality of sets of modular shelf units 310 and able to access the retrieval end 314 of each of the shelf units 310.

As noted above, the shelf units 310 may be angled upwardly, toward the central retrieval area 320 at a predefined angle. This angle may be greater than zero degrees, and less than 60 degrees, though preferably between 5 and 15 degrees, such as 10 degrees, and may be configured such that the retrieval end 314 of the shelf unit presents contents of the shelf unit to the retrieval area 320. In this manner, stacked shelf units 310 may be arranged in a recessive manner with the lower-most shelf units being closest together across the central retrieval area 320 with each ascending shelf unit being spaced further back from the central retrieval area 320. The amount of set-back for each shelf unit as the levels ascend vertically may be configured based on the angle at which the shelf units are upwardly angled toward the retrieval area 320. The set-back of each ascending shelf unit is configured such that a gantry retrieval apparatus 330 may access the contents of each shelf unit 310 at its retrieval end 314 from along a substantially vertical path, and such that the contents retrieved from a shelf unit 310 from the retrieval end 314 may be raised vertically from the shelf unit without contacting a shelf unit above the retrieval end 314 from which the contents were retrieved.

The illustrated embodiment of FIG. 3 shows products 316 arranged on one of the shelf units 310, though products of various shapes and sizes may be stored on each of the shelf units in practice. As shown, the products 316 are biased toward the retrieval end 314 of the shelf unit 310 by a biasing element or "pusher" 318. This pusher may be motor driven (e.g., a ball screw or conveyor arrangement) or spring biased, for example. While the retrieval apparatus 330 is illustrated as a gantry-type automated device with a gripper 332, embodiments may include various types of retrieval apparatuses including multi-axis robotic arms or X-Y robots, for example.

The shelf units 310 may be structured together as shown in banks of rows and columns of shelf units. The illustrated embodiment of FIG. 3 depicts a view in which only a single column of each of two opposing banks of shelf units 310 are shown; however, embodiments may include multiple columns arranged adjacent to one another forming banks of columns and rows. While the illustrated embodiment depicts two, opposing banks of shelf units 310, embodiments may include only a single bank of shelf units, which may be prudent due to space constraints in an installation area. Further, the bank of shelf units 310 may be arranged in a circle, horseshoe, or oval arrangement (resembling a stadium) where the rows of shelf units 310 may be adjacent to one another, but unevenly spaced as the columns form a curved portion of the bank of shelf units.

Each shelf unit 310 may be configured with a mechanism for advancing products on the shelf from the loading end 312 toward the retrieval end 314. Arranging the shelf units 310 at an upwardly-tilted angle maintains the products on the shelf in a properly oriented position, which may facilitate retrieval by the retrieval apparatus 330. While horizontally disposed shelves may be used to hold products, in order to position the products for retrieval, a biasing mechanism is provided. Such a biasing mechanism is configured to apply a force which may press a line of products against a retaining device on a front of the shelf. In such an embodiment, retrieval may be difficult or problematic as a front-most product may be fictionally engaged between the retaining element and either a pusher or a product being driven by a pusher. Similarly, with a downwardly-inclined shelf unit, whether the products are biased toward a retrieval end by only gravity or assisted by a pusher, the same problem may occur where a product is frictionally engaged between a retaining element and a product or the pusher. Embodiments described herein using an upwardly-inclined shelf unit 310 allow a product to be advanced from a loading end 312 of the shelf unit to the retrieval end 314 of the shelf unit without squeezing the product between a retaining element and another product.

Embodiments described herein may include a retaining element at the retrieval end 314 of the shelf unit, toward which a product is biased by a mechanism for advancing the product on the shelf. Optionally, a sensor may be used in lieu of a retaining element such that a mechanism that advances products toward the retrieval end 314 of the shelf 310 may advance the products until a sensor, such as an optical sensor, proximity sensor, or the like, in communication with processor 200 detects a product at the retrieval end 314, at which point the mechanism for advancing the products may be stopped through control by the controller 125, for example.

The mechanism, such as the pusher, for advancing the products on the shelf from the loading end 312 toward the retrieval end 314 may include a spring-biased push plate, a conveyor belt disposed on the shelf unit or on a side of the shelf unit, or screw/auger type device configured to rotate and advance products along the shelf unit responsive to the rotation. The mechanism may be configured to provide only sufficient pressure to advance the products up the upwardly inclined shelf unit 310 toward the retrieval end 314, without squeezing the product between a retaining device at the retrieval end 314 and the mechanism. As noted above, the mechanism may be controlled by the controller 125 to maintain a product at the retrieval end 314, which may remove the need for a retaining member.

While the retrieval apparatus 330 is configured to access the retrieval end 314 of the shelf unit 310 in the retrieval area 320, the loading end 312 of the shelf units 310 may be accessible to a user or an automated loading mechanism. In this manner, the retrieval apparatus 330 may function autonomously without interruption while products are loaded onto a shelf unit 310 from the loading end.

The retrieval unit 330 may be configured to identify a product that is retrieved from a shelf unit 310. The identification may be, for example, through reading of a barcode of the product, through radio frequency identification (RFID) of the product, optical character recognition (OCR) of a label of the product, or the like. The identification may be performed by the retrieval unit 330 through a sensor attached to the retrieval unit in communication with a processor, such as processor 200 of controller 125. Such identification may be a confirmation of identification of the product, as systems described herein may be configured to store a location of a product on a shelf, such as in memory device 215 of the controller 125. The location of a product on a specific shelf unit 310 may be established based on a loading of the product through the loading end 312 of the shelf unit. To correlate a specific shelf unit 310 with a specific product, a user or device loading the product onto a shelf may provide an identification of the product (e.g., through barcode scanning, RFID reading, etc.) to a controller 125 and identify the shelf unit, such as through a barcode scanning or RFID reading of a shelf unit, or manual entry of an identifier of a shelf unit. In this manner the controller 125 may correlate a specific shelf unit with a product to facilitate retrieval of products from the respective shelves.

The retrieval unit 330 may include an end-of-arm-tool configured to pick up and retrieve a product from one of the shelf units 310. The end-of-arm-tool may be embodied by a variety of configurations, such as a gripping claw which may have two or more fingers to "grab" the product from the respective shelf, and/or a tool having one or more suction cups attached thereto. In an example embodiment in which the end-of-arm-tool includes a suction cup mechanism for retrieving a product, the one or more suction cups may be in fluid communication with a vacuum source to draw a vacuum within the cup(s) in order to adhere the retrieved product to the suction cup(s). The vacuum source may be, for example, an air pump with a tubular conduit to the end-of-arm-tool. The vacuum drawn within the suction cups may be drawn on-demand by, for example, the controller 125 in response to the end-of-arm-tool being proximate a product to be retrieved. The vacuum may be selectively applied to the suction cups by valves between the vacuum source and the suction cups, or by turning on and off the vacuum source. Further, valves may be used to activate some, but not all of the suction cups. The suction cups may be sized and configured to attach to a wide variety of products of various shapes, sizes, and weights. Larger suction cups may be present for use with larger, heavier products, or multiple smaller suction cups may be used for the same purpose. Similarly, small products may not require or be able to contact all of the suction cups of the end-of-arm-tool such that some vacuum cups may simply draw air in response to the smaller object being picked up, which may be inefficient. As such, some suction cups may be selectively actuated to draw suction, such as by valves that restrict or allow vacuum to one or more of the suction cups.

The end-of-arm-tool, which may be attached to a gantry retrieval device 330 or a multi-axis robotic arm may be capable of retrieving products of a variety of packaging configurations through use of the suction cup arrangement or gripper devices. Packaging may include boxes, bottles, blister packs, articles on cardstock backing, etc. The type of packaging for a product along with the size may be identified by the product identification. When a product is loaded onto a shelf unit 310, in providing an identification of the product being loaded onto the shelf, the packaging type may be included in the product identifying information. This may be stored, for example, in memory device 215, such that in response to an order to retrieve and dispense a product, the packaging configuration of the product may be known and the end-of-arm-tool may adapt to the packaging configuration.

Upon retrieval of a product from a shelf unit 310, the retrieval device 330 may dispense the product to a dispensing location. The dispensing location may be a location from which the product is packaged and transported to its destination, or the dispensing location may be an intermediate location in the dispensing process. For example, products that are retrieved may include an indication of the product identification, but may lack an indication of the destination of the product or a recipient thereof. As such, the dispensing location may include a labeling station, where a product that is retrieved and dispensed receives a label. The label may include human readable text, machine readable codes (e.g., barcodes or RFID identifiers), and the like. The label information may include an indication of the product identification, an indication of a destination, an indication of a recipient, an indication of instructions to accompany the product, etc.

According to an example embodiment described herein, the retrieval device 330 may retrieve a product and dispense that product to a conveyor system, configured to advance the retrieved product from the retrieve/dispense system 300 to a labeling station. The retrieved product may be scanned, such as by a barcode scanner, RFID reader, or image sensor (e.g., for optical character recognition). The scanning and identification of the product may be to confirm that the retrieved product is the expected product for an order. Provided the retrieved product is correct, a label may be printed for the product including information such as a recipient, destination, and product identifier, or the like. Once labeled, the product may be ready for sending to a recipient. The product may be advanced to a queue from which products may be retrieved for placement into a transport container, such as a tote, envelope, bag, etc. Prior to moving the product to the transport container, the product may be measured, such as by weight, as a verification that the product is correct. While the weight may not be a unique identifier, the weight may provide an additional measure of confidence that the dispensed product is correct, since the retrieval/dispensing system 300 relies upon correct labeling for the product. Should a label of the product be incorrect, the weighing of the product may identify a mislabeling issue.

Figure 4:
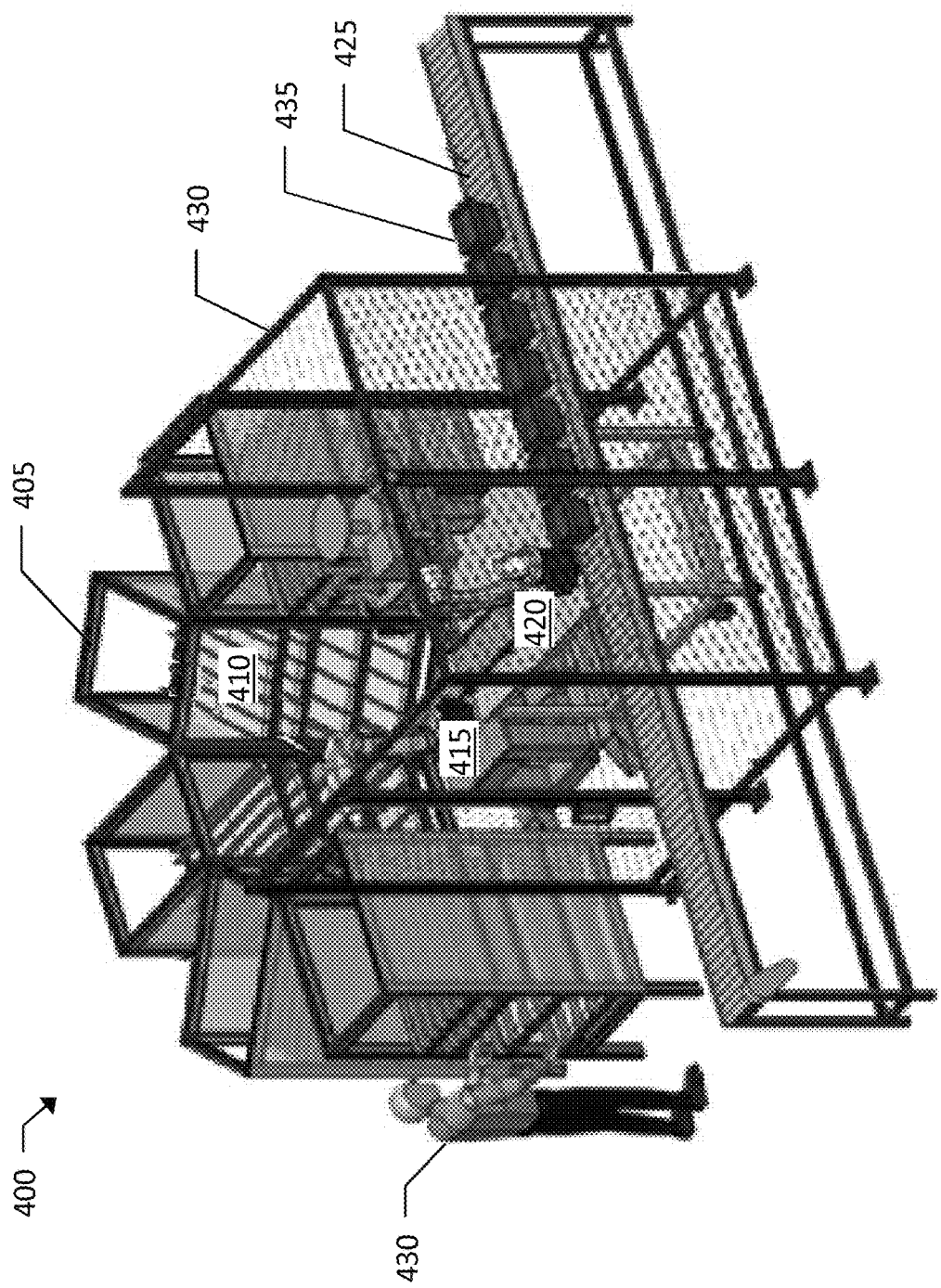
FIG. 4 illustrates an example embodiment of a system employing dispensing and retrieval devices of example embodiments of the present disclosure.

FIG. 4 illustrates an example embodiment of a system 400 employing dispensing devices as described herein. As shown, modular shelf units 405 are arranged about a retrieval area 415 that includes a robotic retrieval device, which in the illustrated embodiment is a multi-axis robot. The retrieval area may be a secure area, secured for example by fencing 430, accessible only to authorized personnel and only when the system is properly locked-out. This may enable controlled dispensing using the retrieval device under controlled conditions without concern for manual interference. Proximate the retrieval area is shown a staging area 420, from which retrieved products are staged for dispensing into bins 435 on conveyor 425. The modular shelf units 405 may be accessible on a loading end of the shelf units by an operator 430 positioned outside of the fenced, secured area. The operator 430 may replenish shelf units without interfering with or interrupting the retrieval and dispensing operations. FIG. 4 is one example implementation of the storage and retrieval apparatuses described herein.

Figure 5:
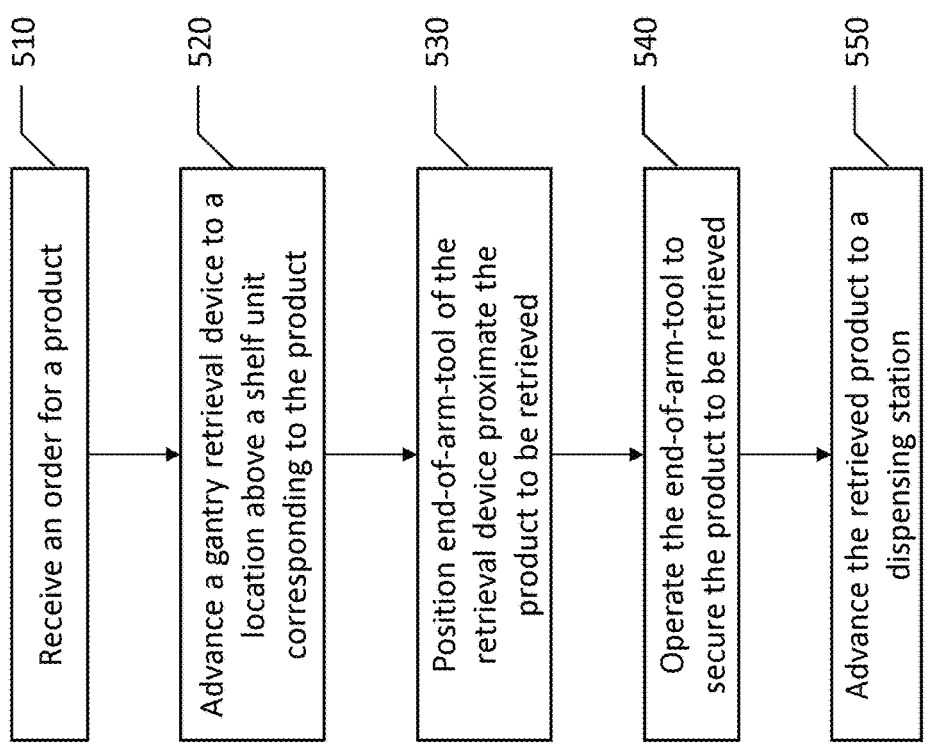
FIG. 5 is a flowchart of some of the operations performed by a retrieval and dispensing system according to example embodiments of the present disclosure.

FIG. 5 is a flowchart of a method and program product according to an example embodiment of the present invention. It will be understood that each block of the flowchart and combinations of blocks in the flowchart may be implemented by various means, such as hardware, firmware, processor, circuitry, and/or other devices associated with execution of software including one or more computer program instructions. These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the disclosure, as shown in FIG. 5, may include receiving an order for a product at 510. The order may be received, for example, at controller 125, such as through communications interface 220. The gantry retrieval device may be advanced, such as by instruction from the controller 125, to position the gantry retrieval device over a shelf unit that corresponds to the ordered product at 520. The end-of-arm-tool of the retrieval device may be positioned, such as by descending upon, proximate the product to be retrieved at 530. The end-of-arm-tool may then be operated to attach to, such as through grasping or using vacuum, the product to be retrieved at 540. At 550, the retrieval device may be advanced from the shelf unit of the product to a dispensing station, where the product may be dispensed.

Moreover, in some embodiments additional operations may also be included. It should be appreciated that each of the modifications, optional additions, or amplifications may be included with the operations above either alone or in combination with any others among the features described herein.

In an example embodiment, an apparatus for performing the method of FIG. 5 may include a processor, such as processor 200 of controller 125, configured to perform some or all of the operations (510-550) described above. The processor may, for example, be configured to perform the operations (510-550) by performing hardware implemented logical functions executing stored instructions, or executing algorithms for performing each of the operations. Alternatively, the apparatus may include means for performing each of the operations described above.

An example of an apparatus according to an example embodiment may include at least one processor and at least one memory including computer program code. The at least one memory and the computer program code may be configured to, with the at least one processor, cause the apparatus to perform the operations 510-550.

An example of a computer program product according to an example embodiment may include at least one computer-readable storage medium having computer-executable program code portions stored therein. The computer-executable program code portions may include program code instructions for performing operations 510-550.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for dispensing articles, the apparatus comprising:
   a plurality of shelf units in two opposing banks of shelf units, each bank having rows of shelf units and columns of shelf units, wherein each shelf unit is longitudinally elongated between a first end and an opposing second end, wherein the respective first end of each shelf unit is configured to receive articles in a respective direction from the respective first end toward the respective second end, and wherein the respective second end of each shelf unit is configured to present articles for retrieval; and
   a retrieval area defined between the two banks of shelf units, wherein the second end of each shelf unit faces the retrieval area, wherein the second ends of the shelf units of a first bank of the two opposing banks face the second ends of the plurality of shelf units of a second bank of the two opposing banks;
   wherein each shelf unit is inclined on an upward angle toward the retrieval area,
   wherein the retrieval area is an enclosed, access-controlled area, wherein the plurality of shelf units cooperate to at least partially enclose the retrieval area.

2. An apparatus comprising:
   a plurality of shelf units comprising at least a first shelf unit and a second shelf unit, each shelf unit being longitudinally elongated between a first end and an opposing second end, wherein the first end is configured to receive articles in a direction from the first end toward the second end, and the second end is configured to present the articles for retrieval in a retrieval position, wherein each of the plurality of shelf units is arranged with a respective second end facing a retrieval area, wherein each of the plurality of shelf units is inclined with the first end being lower relative to the second end, wherein the first and second shelf units are arranged so that the second end of the first shelf unit faces the second end of the second shelf unit; and
   a retrieval device comprising an end-of-arm-tool, wherein the retrieval device is disposed within the retrieval area and configured to attach the end-of-arm-tool to an article being presented in the retrieval position by the second end of any one of the plurality of shelf units,
   wherein the retrieval area is an enclosed, access-controlled area, wherein the plurality of shelf units cooperate to at least partially enclose the retrieval area.

3. The apparatus of claim 2, wherein each of the shelf units is inclined between about five degrees and about fifteen degrees from horizontal.

4. The apparatus of claim 2, wherein the plurality of shelf units are positioned in a semicircular arrangement.

5. The apparatus of claim 2, further comprising fencing, wherein the plurality of shelf units and the fencing cooperate to fully enclose the retrieval area.

6. The apparatus of claim 2, wherein during operation of the retrieval device, the apparatus is configured to prevent access to the retrieval area and to permit access to the first ends of the plurality of shelf units.

7. The apparatus of claim 2, wherein the retrieval device comprises a gantry from which an end-of-arm-tool extends into the retrieval area, wherein the gantry advances the end-of-arm-tool along the second end of the plurality of shelf units.

8. The apparatus of claim 7, wherein the end-of-arm-tool comprises at least one of:
- one or more suction cups configured to attach to and secure an article to the end-of-arm-tool; or
- a gripping apparatus having two or more fingers configured to grasp the article from a retrieval end of a shelf unit.

9. The apparatus of claim 2, wherein the plurality of shelf units are arranged in a bank of rows of adjacent shelf units, and columns of vertically stacked shelf units, wherein rows are arranged with longitudinally extending sides facing one another.

10. The apparatus of claim 9, wherein the bank of rows and columns of shelf units is configured with each row above a bottom row in the vertical stack offset away from the retrieval area relative to a row immediately below, wherein the bank of rows and columns of shelf units defines a respective opening at the first end of each shelf unit of the plurality of shelf units, wherein the respective opening at the first end of each shelf unit is configured to receive the articles therethrough in the direction from the first end toward the second end.

11. The apparatus of claim 10, wherein the bank of shelf units is a first bank of shelf units, the apparatus further comprising a second bank of rows of adjacent shelf units and columns of vertically stacked shelf units, wherein the second end of the shelf units of the second bank is arranged to face the second end of the shelf units of the first bank, wherein the retrieval area is defined between the first bank and the second bank.

12. The apparatus of claim 2, wherein at least one of the plurality of shelf units comprises a pusher to bias the articles received on the shelf unit toward the second end of the shelf unit.

13. The apparatus of claim 12, wherein the pusher comprises a screw-driven biasing plate.

14. The apparatus of claim 12, wherein the pusher comprises a conveyor belt.

15. The apparatus of claim 2, further comprising a controller, wherein the controller is configured to receive an order for an article, identify a shelf unit corresponding to the article of the order, advance the retrieval device to the shelf unit corresponding to the article of the order, retrieve the article of the order, and dispense the article of the order to a dispensing station.

16. The apparatus of claim 15, wherein an association is made between the article and a shelf unit in response to an indication of the article and an identifier of the corresponding shelf unit being provided to the controller during a loading operation of the shelf unit.

17. The apparatus of claim 15, wherein the dispensing station comprises a scale, wherein a weight of the article of the order is measured by the scale at the dispensing station and compared against an expected weight of the article for verification.

18. The apparatus of claim 2, wherein the plurality of shelf units further comprises a third shelf unit, wherein each of the first, second, and third shelf units is elongated along a respective longitudinal axis, wherein the longitudinal axis of the third shelf unit is angularly offset from the longitudinal axis of the first shelf unit and the longitudinal axis of the second shelf unit, wherein the retrieval device comprises a multi-axis robotic arm, wherein the first, second, and third shelf units are positioned relative to each other and the multi-axis robotic arm so that the multi-axis robotic arm can access each of the first, second, and third shelf units.

19. The apparatus of claim 2, wherein at least one shelf unit of the plurality of shelf units comprises:
- a motor-driven conveyer that is configured to move the articles received on said shelf unit toward the second end of said shelf unit;
- a sensor that is configured to detect arrival of the article in the retrieval position at the second end of said shelf unit; and
- a controller in communication with the sensor and the motor-driven conveyor, wherein the controller is configured to stop movement of the motor-driven conveyor when the sensor detects arrival of the article in the retrieval position at the second end of said shelf unit.

20. The apparatus of claim 2, further comprising a labeling station, wherein the labeling station comprises a printer to print indicia to a label corresponding to an article retrieved from one of the plurality of shelf units, and wherein the labeling station is configured to apply a printed label corresponding to an article in response to the article being received at the labeling station.

* * * * *